(12) United States Patent
Rittmann

(10) Patent No.: US 6,296,355 B1
(45) Date of Patent: Oct. 2, 2001

(54) WIRE-FRAME EYEWEAR ASSEMBLY WITH TRANSVERSELY-LITHE SIDEPIECE ELEMENT

(76) Inventor: Jean V Rittmann, 4700-176 St. SW., #A303, Lynnwood, WA (US) 98037

( * ) Notice: Subject to any disclaimer, the term of this patent is extended or adjusted under 35 U.S.C. 154(b) by 0 days.

(21) Appl. No.: 09/532,484

(22) Filed: Mar. 22, 2000

(51) Int. Cl.⁷ ..................................................... G02C 5/14
(52) U.S. Cl. ........................... 351/111; 351/114; 351/121
(58) Field of Search ........................................ 351/111, 113, 351/114, 119, 121, 124, 128, 133, 134

(56) References Cited

U.S. PATENT DOCUMENTS

| | | | |
|---|---|---|---|
| 4,124,041 | 11/1978 | Higgins | 140/3 CA |
| 4,508,526 | * 4/1985 | Dutcher | 351/47 |
| 4,598,983 | 7/1986 | Tabacchi | 351/95 |
| 5,135,296 | * 8/1992 | Lingberg | 351/106 |
| 5,523,806 | 6/1996 | Sakai | 351/101 |
| 5,818,566 | * 10/1998 | Carlon et al. | 351/110 |
| 5,859,584 | 1/1999 | Rittmann | 351/111 |
| 6,015,212 | * 1/2000 | Fortini | 351/92 |

OTHER PUBLICATIONS

The abandoned application serial no.:09/075,800, the abandoned date Sep. 9, 1999.*

* cited by examiner

*Primary Examiner*—Huy Mai

(57) ABSTRACT

This invention is a completely mechanical method of constructing eyewear, without brazing. An eyewear frame is formed by a continuous, bent, spring wire. Sidepiece 47 is fixedly attached to frame endpiece parts 30 and 31 by mating a bent portion of each within compression spring 40. The Vertically tall, transversely thin sidepieces can support with scant lateral pressure to a wearer's head, and can close can close against the frame without hinges. The length of a spring over the endpiece confines lense 56 in upper and lower portions of a frame's eyewire. Lense 55 has been removed by laterally compressing spring 40 around the folded-over endpiece parts and letting the ends of the endpiece parts spread vertically apart. Elongated members, unrelated to eyewear endpieces and sidepieces, can be fixedly attached and removed, and/or spread in the ways described above. A nosebridge can be formed by a continuous, bent, spring wire. It's transversely elongated bridgeportion 20 adds strength and stability to the frame. Hook 22 at an upper lateral end of the bridgeportion plus a bridgeportion frontward bow substantially mechanically encircle the frame's bridge in the latitudinal/longitudinal plane. The hooks and bow hold together upper and lower medial portions of a frame's eyewire. The vertical stability of the lenses, supported in the frame's eyewires, keeps the nosebridge from rotating. Nosebridge hook 22 continues downwardly/rearwardly as nosepad arm 60. The lateral angling of the arms also keeps the nosebridge from rotating. Each wire end of the arms upwardly loop; each loop can secure a nosepad balljoint.

11 Claims, 4 Drawing Sheets

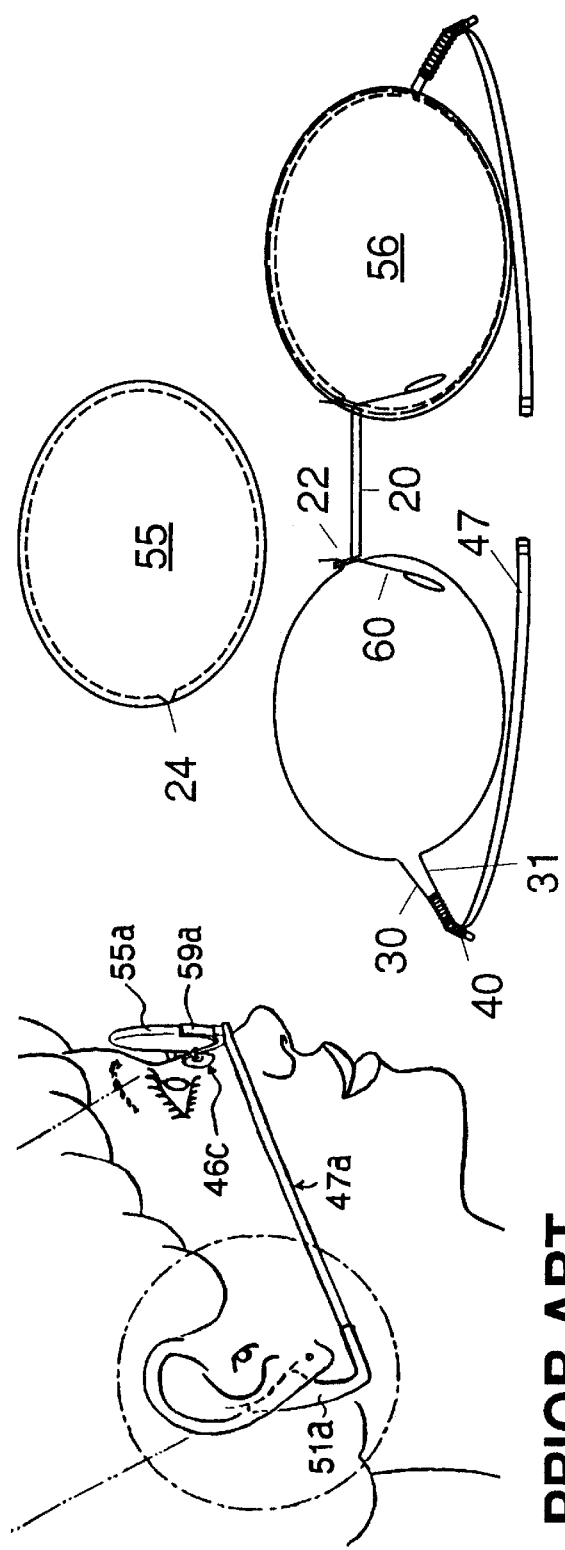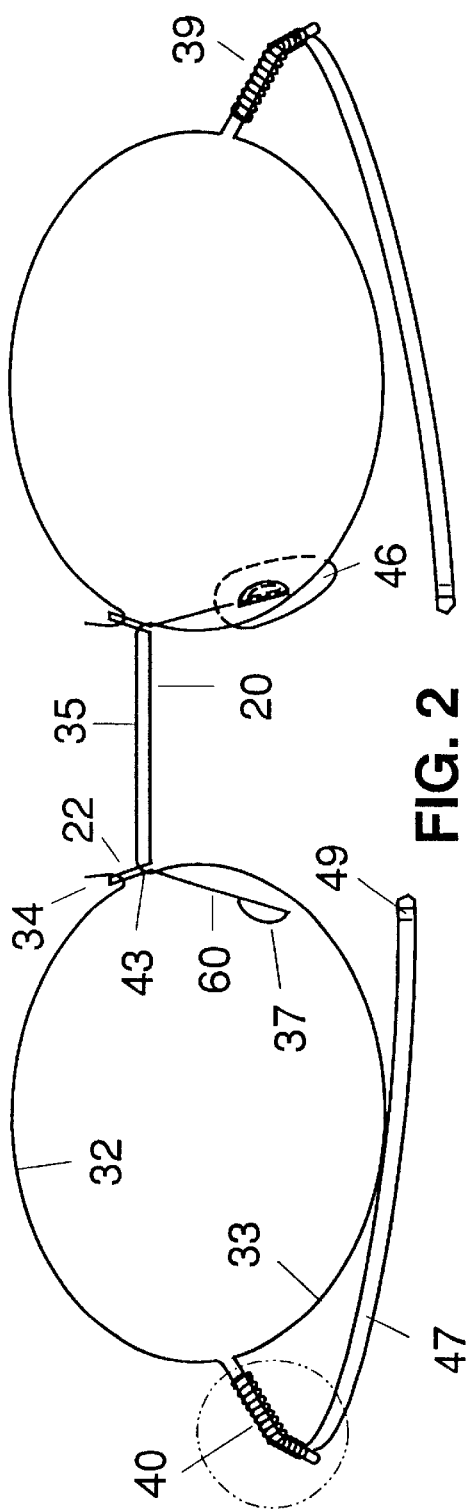
PRIOR ART
FIG. 1
FIG. 3
FIG. 2

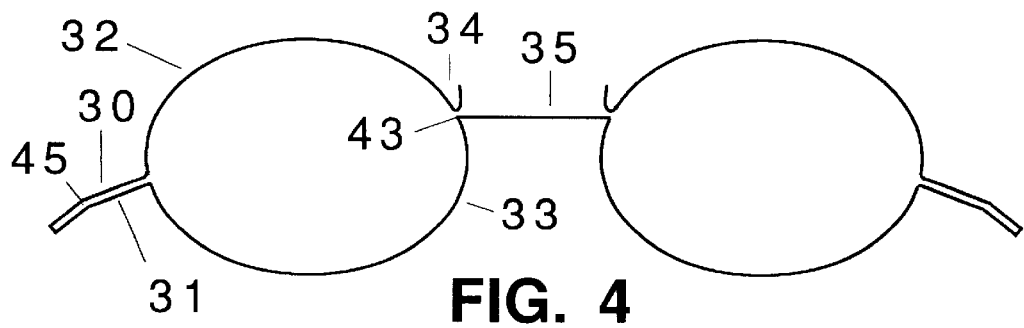
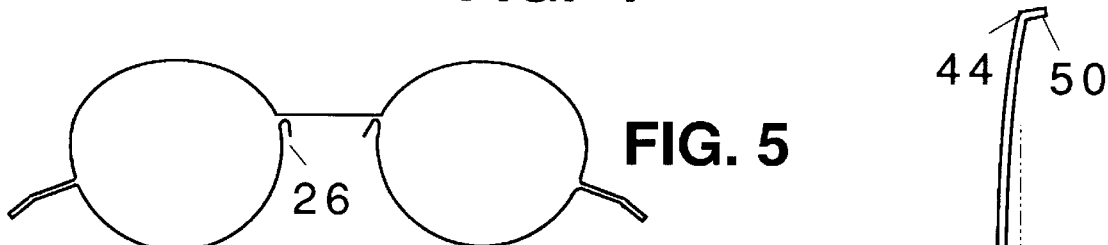
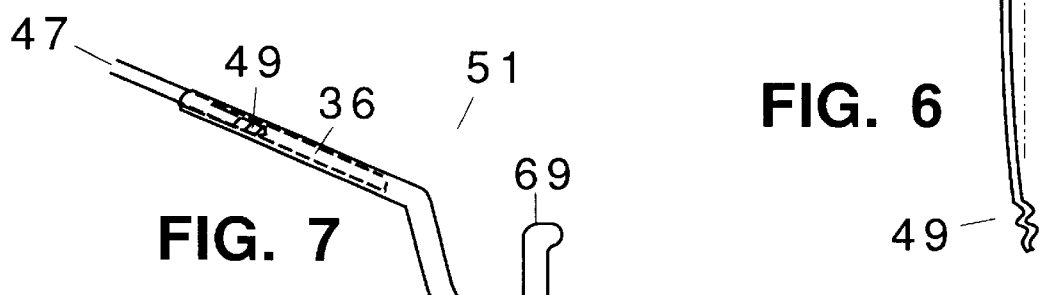
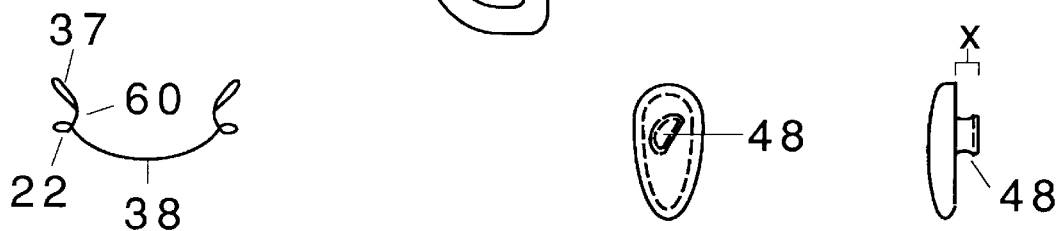

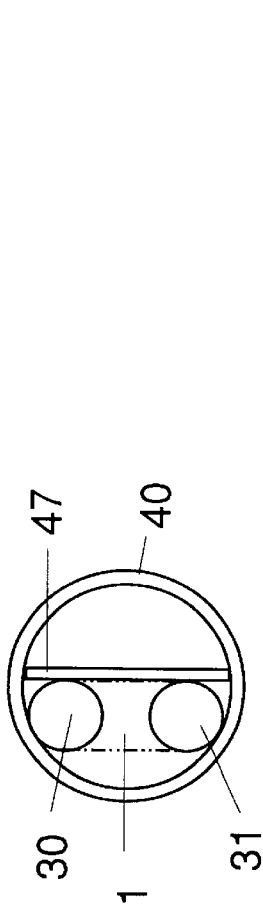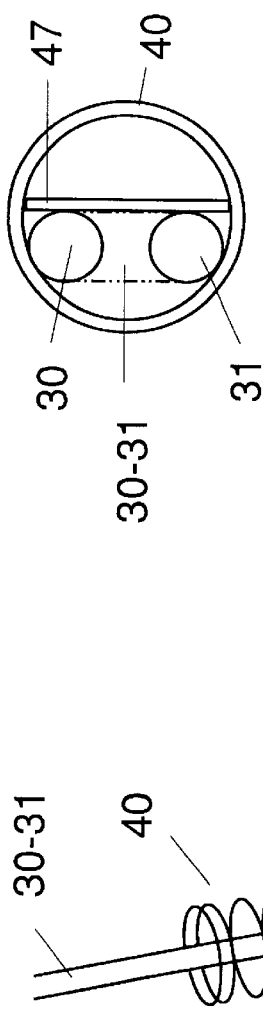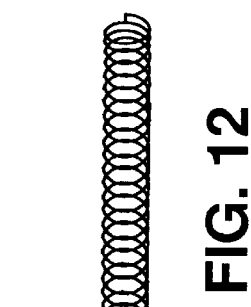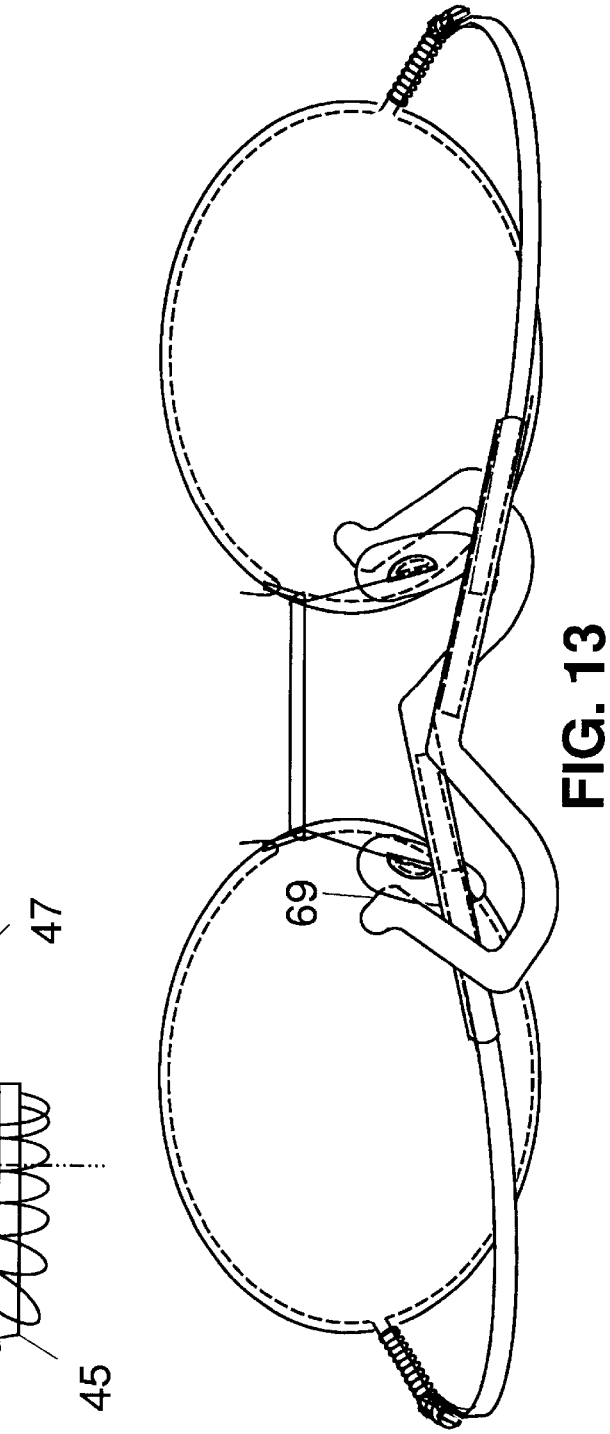

WIRE-FRAME EYEWEAR ASSEMBLY WITH TRANSVERSELY-LITHE SIDEPIECE ELEMENT

CROSS-REFERENCE TO RELATED APPLICATIONS

Not Applicable

STATEMENT REGARDING FEDERALLY SPONSORED RESEARCH OR DEVELOPMENT

Not Applicable

REFERENCE TO A MICROFICHE APPENDIX

Not Applicable

BACKGROUND OF INVENTION

This invention relates to spectacles, eyeglasses, and metal working means to assemble or disassemble using a circular spring applier or remover. More specifically, a means to secure lenses, temples/sidepieces, earpieces, and nosepieces together as completed eyewear, and a means to fixedly attach mated elongated members with a compression spring.

Up till now, metal eyewear frames have been constructed by brazing/soldering and require great precision to make them consistent and have matched sides. Prior-art metal frames often use screws to secure two brazed-on, tapped, mateable, barrel ends of a bezel tailored around a lense. Nosepad arms and a nosebridge are brazed to the bezels. Nosepad arms often have a brazed on clamp or centrally-tapped cup. The nosepads, secured with a screw to a cup, become immobile if all three holes (including nosepad hole) don't precisely line up. Endpieces and tapped barrel hinges are often brazed onto the frame. A barrel is brazed to each temple's front edge. Screws attach endpiece and temple barrels. Lastly an earpiece sleeve is placed on each temple, then bent. Each prior-art spring hinge adds an extra spring, a tapped portion, and a screw portion in a brazed-on cavity.

Including spring temples, prior-art metal frames average 37 parts for assembly (6 screws, 2 bezels, 4 bezel barrel ends, 1 nosebridge, 2 frame endpieces, 4 formed/tapped barrel pieces, 2 temples, 2 earpieces, 2 springs, 2 screws in springs, 2 spring casings, 2 nosepad arms, 2 tapped nosepad cups, 2 nosepads [each sometimes made of 2 parts: metal and plastic]). Often the total is 18 brazed joints; each then requires polishing. Plating is used to conceal brazing color variance. That's a lot of assembly. The combination of needed transverse and longitudinal strength and large number of pieces and welds adds to the weight of the frame. To reduce eyewear weight, light-strong metals, like titanium, are used; adding expense and brazing difficulty. Expensive combination metals are often used to braze to spring metals, which are difficult to attach to without annealing them from the high temperature of brazing. Because brazing spring metal makes it brittle, or anneals and unravels its form, parts near a braze must remain sizeable. Brazing techniques are often trade secrets. Overall required, complicated, precision may be why the number of quality metal frame manufacturers is limited. Europe is still known for the best quality frames (like Switzerland was known for watches before U.S. mass production).

With wearer motion, screws loosen and the rigid frame can bend. Poor brazed joints can break from eyewear use. The more flexible frames tend to reduce tension to the head, compromising support for temple-style eyewear. Fishline, when used, stretches, so lenses can accidentally pop out of a frame. Nuts and bolts, used on some rimless lenses, easily loosen with wear. Slight frame imperfections can tilt the frame on the wearer. The bulk of the rigid frame, hinges, nosepad arms, and especially the bezel ends can complicate the appearance of glasses without adding style.

U.S. Pat. No. 5,859,684 by Jean V. Rittmann, granted Jan. 12, 1999, entitled EYEGLASS SUPPORT SYSTEM (see Prior-Art FIG. 1), discloses eyewear that support by "leveraging eyeglasses only onto the wearer's nose" and support "without laterally pressuring the wearer's head". Constructing this lever system; using rigid frames, and hinges with stops (P.O. not. 89); means sidepieces must be spread/tailored to each wearer's head width without pressure. A sidepiece length-changing method further complicates frame structure. Without stops, the frame may wobble side to side with a wearer's head movement. Also, production may be limited to established manufacturers, as prior-art frame construction is so complex.

U.S. Pat. No. 4,598,983 by Vittorio Tabacchi and Vicenzo Veil, granted Jul. 8, 1986, entitled METAL FRAME FOR EYEGLASSES, discloses rings of metal, stainless steel, wire; each intended to receive a lense. Lines 30-34, state that lateral regions of the rings are "weakest and most susceptible to experiencing permanent deformation as a result of annealing to which they have been subject in the operation of the welding of the noses."

U.S. Pat. No. 4,124,041 by Larry Higgins, granted Nov. 7, 1978, entitled METHOD OF ASSEMBLING COIL SPRINGS, discloses a helical lacing wire wrapped around overlapped joint segments of adjacent springs and levelizer wire. Any two adjacent coil springs, if attached only to a levelizer by one central lacing, can be rotated. If each coil were considered an elongated member, it is not held from circularly pulling out of the lacing except by friction. Since each coil and the levelizer wire are round (see his FIG. 9), all can rotate from each other within the lacing.

U.S. Pat. No. 5,523,806 by Yuichi Sakai, granted Jun. 4, 1996, entitled EYEGLASSES HAVING IMPROVED LENS FASTENING MEMBER, discloses a lateral lense fastening means using integrally connected, parallel upper and lower wires and a metal piece slidably movable thereon.

BRIEF SUMMARY OF THE INVENTION

This invention is a completely mechanical method of constructing eye-wear, without brazing. A frame can be formed by a continuous, bent, spring wire. Each sidepiece can fixedly attach to a corresponding frame endpiece by mating a bent portion of each within an extension spring. Vertically stiff, transversely lithe sidepieces can support with scant lateral pressure to a wearer's head, and can close to the frame without hinges. The length of a spring over the two-part endpiece confines a grooved lense in upper and lower portions of a frame's eyewire. A lense can be removed by laterally compressing the spring around the endpiece and spreading the endpiece parts apart. Elongated members, unrelated to eyewear, can be fixedly attached and removed, and/or spread in the ways described above.

A nosebridge can be formed by a continuous, bent, spring wire. It's bridgeportion has a central, frontward bow, and hooks at it's lateral sides. Each hook plus the bow substantially encircle the frame bridge in the latitudinal/longitudinal plane, and hold together upper and lower medial portions of a frame's eyewire. The vertical stability of the lenses, supported in the eyewires, keeps the nosebridge from rotating. The nosebridge hooks continue downwardly/rearwardly as nosepad arms. The end of each arm upwardly loops; each loop can secure a nosepad balljoint.

ADVANTAGES OF THE INVENTION

Eyewear, made this way: can be assembled without tools; can weigh ¼ ounce (7 grams): much less than prior-art glasses; need only ten parts; flex without permanent distortion; won't disassemble with wear (as screws do); and look nice. There is no need for tiny casted metal parts, hinges, tiny screws, tapping, brazing, polishing, plating, or earpiece over-molding (or earpiece bending). The invention can be constructed out of small diameter spring metal, which is nearly impossible to prior-art braze, provides simple means to insert/remove lenses, and lets nosepads pivot.

The invention provides advantages for lever eyewear by: providing only scant pressure to a wearer's head without hinges, reducing rearward frame weight at the ear-rest, and deterring over-shortening of earpieces by causing front frame to flex rearwardly. Spring metal elongated members, unrelated to eyewear, can also be fixedly attached/unattached by hand without the permanency and bulk of crimping, or the annealing of brazing.

BRIEF DESCRIPTION OF THE DRAWINGS

FIG. 1 is Prior Art shown in Pat. No. 5,859,684, FIG. 14

FIG. 2 is an eyewear assembly of the invention's parts, front view.

FIG. 3 is the assembly of FIG. 2 plus lenses minus nosepiece, front view.

FIG. 4 is a single metal wire bent into a frame, front & rear views.

FIG. 5 is a frame embodiment with bottom hooks, front view.

FIG. 6 is a RHS sidepiece, top view.

FIG. 7 is an ear-rest with a sidepiece inserted, side view.

FIG. 8A is a LHS nosepad, front view.

FIG. 8B is a LHS nosepad, side view.

FIG. 9A is a nosebridge embodiment, top view.

FIG. 9B is a nosebridge embodiment front view.

FIG. 9C is a nosebridge embodiment, RHS view.

FIG. 9D is a detail of FIG. 9C

FIG. 10 is a detail of FIG. 2, top view.

FIG. 11 is a detail of FIG. 10, cross sectional view.

FIG. 12 is an embodiment of a compression spring.

FIG. 13 is an embodiment of completed eyewear, rear view.

DESCRIPTION OF THE NOTATIONS

Figure 14:
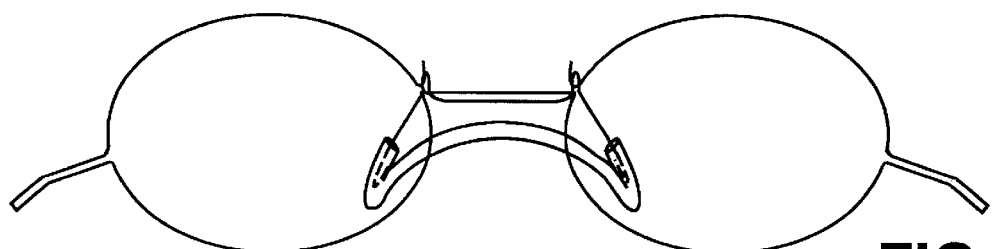
FIG. 14 is a frame with nosebridge and nosepiece, rear view.

| | |
|---|---|
| 20 | a nosebridge bridgeportion |
| 22 | a nosebridge hook |
| 24 | a non-grooved lense portion |
| 26 | a bottom frame hook |
| 30 | the upper part of a RHS endpiece |
| 31 | the lower part of a RHS endpiece |
| 30–31 | a RHS endpiece/a first member |
| 32 | the upper portion of a RHS eyewire |
| 33 | the lower portion of a LHS eyewire |
| 34 | a frame hook |
| 35 | a frame-bridge |
| 36 | an ear-rest hollow |
| 37 | a RHS nosepad loop |
| 38 | a bridgeportion bow |
| 39 | a LHS compression spring |
| x | a balljoint's 'height' |
| 40 | a RHS compression spring |
| 43 | a frame bow |
| 44 | a bent end |
| 45 | an endpiece/1st member bend |
| 46 | a LHS nosepad |
| 47 | a RHS sidepiece/2nd member |
| 48 | a nosepad balljoint |
| 49 | sidepiece bumps |
| 50 | a tab |
| 51 | a RHS ear-rest |
| 55 | a right hand side lense |
| 56 | a left hand side lense |
| 60 | a nosepad arm |
| 69 | an ear-rest nub |
| 70 | a spot-weld |
| 71 | a spot-weld |

DETAILED DESCRIPTION OF THE INVENTION

1. Description of One Embodiment of the Invention

FIG. 1 is Prior Art shown in Pat. No. 5,859,684, FIG. 14, where the embodiment of that system is shown on a wearer; RHS (right-hand side) view. Notations are ear-rest 51*a*, sidepiece 47*a*, nosepad 46*c*, RHS lense 55*a*, and frame 59*a*. These part names are used in this text.

FIG. 2 shows an eyewear assembly of the invention's parts, front view. In this embodiment, upper portion RHS frame eyewire 32 terminates medially in frame hook 34. The medial end of lower portion RHS frame eyewire 33 becomes frame bridge 35 at frame bow 43 (43 is shown better in FIG. 4.) Hook 34 and bow 43 are semi-encircled by nosebridge hook 22. Nosebridge bridgeportion 20 positions under frame bridge 35 (but can continue frontwardly/upwardly around frame bridge). A lateral edge of bridgeportion 20 ovals upwardly to rearwardly to downwardly as hook 22. After hook 22, the nosebridge continues rearwardly/downwardly as nosebridge nosepad arm 60. Also angling arms laterally can help slant nosepads, when added, to tailor to a wearer's nose slopes, and can help keep the arms positioned rearwardly on the frame. Arm 60 upwardly loops forming RHS nosepad loop 37. The loop is for supporting a nosepad. LHS (left-hand side) nosepad loop (not noted) is shown supporting LHS nosepad 46. Hook 22 is confined from moving medially by the transverse strength of bridgeportion 20. The bridgeportion adds strength and stability to the frame. When grooved lenses are inserted between upper and lower eyewires, the vertical stability of the lenses keeps the nosebridge, eyewires, and endpieces from rotating. Compression springs 39 and 40, sidepiece 47, and sidepiece bumps 49 are noted.

FIG. 3 is the assembly of FIG. 2 plus lenses minus the nosepad, front view. Lens 55, removed from the frame, has a substantially circumferential etched-edge groove. This groove can be similar to prior-art semi-encircling grooves cut to fit prior-art eyewires (like fishline). Tiny non-grooved lense portion 24 can be left to optically align the lense in the frame at the endpiece. RHS & LHS lenses 55 & 56 may be etched from prior-art optical disks. The upper and lower portions of the LHS eyewire (not noted) engage the groove of lense 56 by positioning within the groove. Compressed laterally by unseen forces, extension spring 40 allows the upper part of a RHS endpiece 30 to be vertically spread apart from 31, the lower part of a RHS endpiece. Compressing the spring can expand the grip on the lense enough to remove it. When released, each spring substantially surrounds/secures together the folded-over lengths of an endpiece, securing the lense between upper & lower eyewires. Hook 22, nosepad arm 60, & sidepiece 47 are noted.

FIG. 4 is a single spring wire, bent into a frame, substantially in the flat transverse/latitudinal plane, front view and rear view respectively. A wire end starts as frame hook 34, bends into semi-circular RHS upper portion of frame eyewire 32, bends laterally into RHS upper part endpiece 30, parallelly folds back into RHS lower part endpiece 31 (beneath & against endpiece 30), bends downwardly and semi-circles medially into RHS lower portion eyewire 33, bends at bow 43 into frame bridge 35, and continues into LHS, mirror image portions/parts. The tightly folded-over wire 30-31 produces a vertically tall doubled wire endpiece. Front frame endpiece bend 45 is a rearward bend of both parts (30 and 31) of the RHS endpiece.

FIG. 5 is a frame embodiment with bottom hooks, like hook 26, front view. Using bottom frame hooks does not effect the nosebridge attachment.

FIG. 6 is RHS sidepiece 47, top view. The sidepiece may be made of 0.006 by 0.07 strip wire; thin side shown (but drawn disproportionately thick for visibility). Sidepiece 47 bows slightly medially (to tailor to a wearer's face). Sidepiece bumps 49 are about 0.05" tall. Sidepiece tab 50 can extend inwardly an average 0.05" beyond bend 44.

FIG. 7 is ear-rest 51 with sidepiece 47 inserted, side view. Ear-rest nub 69 rests behind a wearer's ear lobe when worn (wearer not shown). Ear-rest hollow 36 can have side indentations (not shown) to hold sidepiece bumps 49 in a position in the ear-rest (the double bumps catch two indentations). This is the invention's method of changing sidepiece length to fit a wearer. When the ear-rest is transparent, the amount of the sidepiece within it is visible, so a pair of sidepieces can be lengthened equally. This sidepiece/temple length-altering method is free of the bulk, complication, and the side or bottom holes of prior art.

FIG. 8A and FIG. 8B are front and side views respectively of a LHS nosepad; "D" shaped balljoint 48 noted on each. Because this invention can use a single nosebridge made of 0.025" or 0.020" dia. wire, a wire loop can be made small. A balljoint can then have a small base and short (0.1") balljoint 'height' (x in FIG. 8B). The balljoint can be pivotally clamped between the top and bottom of a "D" shaped nosepad arm loop, leaving the pad to tilt somewhat sideways. In comparison, prior-art nosepad arms need about 0.040" dia. wire (big because it needs to braze to bezels). Production circle dia. of a 0.04" wire is >0.2". Such a big wire circling around a pad would need an tall, unsightly, balljoint 'height' (about 0.2") to let the nosepad pivot.

A nosebridge embodiment is shown in FIG. 9A as top view, FIG. 9B as front view, and FIG. 9C as RHS view. The lateral ends of the nosebridge each continue rearwardly/ laterally/downwardly as nosepad arms. Nosepad arms like 60 are shown curved. RHS nosepad loop 37 is shown as "D" shaped, but it's shape can vary with the type of nosepad attached (like it could be rectangular or oval shaped: neither shown). In this embodiment, nosepad hook 22 looks like an upside-down "U". The hook is vertically tall to keep medial upper and lower portions of the eyewire positioned vertical to each other. Like a frame bridge, the nose bridge can be straight and/or bow frontwardly. Nosebridge bow 38 continues forwardly to substantially form a complete circle about the longitudinal/latitudinal plane. (Nosebridge bow 38, frontward of nosebridge hook 22 and nosepad arm 60 are more visible in detail FIG. 9D from the phantom-line encircled portion of FIG. 9C). The flex/resiliency of the nosebridge wire allows this vertically tall/transversely elongated circle to snap on to a frame bridge. The nosebridge can attach to the frame bridge by placing frame hooks into nose-bridge hooks, snapping the bridgeportion bow forwardly under the frame bridge, then flipping nosepad arms behind the lower portion eyewires.

Without frontward bow 38, hook 22 could substantially encircle top and bottom portions of the frame bridge by itself; or nosepad arm 60 could bend near the hook more horizontally, to look like most prior-art nosepad arms; or bow 38 and hook 22 could both be reversed in direction (none shown). All these methods of attaching a nosebridge to a frame have a nosebridge substantially encircling a frame bridge in the longitudinal/latitudinal plane.

FIG. 10 is a detail of FIG. 2, top view. The assembly shows compression spring 40 fixedly attaching sidepiece 47 to endpiece 30–31, where their respective bends (sidepiece bend 44 and endpiece bend 45) mate. Because tab 50 is short, it eases assembly of the mated bends as follows: Sidepiece 47 is inserted into the spring by hooking tab 50 into one end of the spring so it pokes out between the coils, and for ease, screwing the sidepiece about 4 turns into the spring. By compressing the spring, the endpiece can be pushed, by hand, into the spring, mating it against the sidepiece. That is, the sidepiece tab positions between the coils while both are slid onto an endpiece. Then, when endpiece and sidepiece bends nearly mate, the tab may be hooked inside the spring by slightly spreading two coils apart.

The extension spring of the invention acts a bit like a Chinese finger vice. (Pushing a finger in each end of the woven straw cylinder compresses it's length and widens it's diameter. Pulling the fingers apart extends it's length and narrows it's diameter; gripping the fingers inside.) Compressing the extension spring widens it's diameter enough to insert elongated members like a sidepiece and endpiece. The combination of inserted members makes a combined overall diameter, in some direction, nearly that of the inside diameter of the spring when compressed. In example, FIG. 11: a detail of FIG. 10, cross sectional view (from phantom line of FIG. 10), shows when compression is discontinued, the members are frictionally gripped by spring 40.

2. Fixedly Attaching Elongated Members with an Extension Spring

The above method of attachment andlor part confinement/ separation can be used for elongated members unrelated to eyewear. That is, spring metal has tremendous strength (like spring steel near 400 kpsi) compared to most anything, like brass (soft: 40 kpsi, hard: 70 kpsi). Spring metal allows members to be made sometimes one tenth the diameter smaller than equivalent soft metal members. Also, spring metal is resilient and flexes back to shape, as compared to permanently bending, like brass. As spring metal easily anneals with brazing, most springs are mechanically attached with hooks or crimps, both which add substantial diameter to a joint. Often a crimp is made with a sizeable, folded-over piece of soft metal, and is fairly permanent. This invention's method of attachment has the advantages of barely increasing the overall diameter of the combined diameter of two members, and allowing the members to easily detach/reattach. This text provides no specific examples outside of eyewear.

Referring again to FIG. 10, endpiece 30-31 and sidepiece 47 are examples of first and second elongated members, respectively, in extension spring 40. The elongated members are fixedly attached by confining a mated bent portion of each within an extension spring (first member bend 45 mates with second member bend 44). The assembly and disassembly of parts is by compression (and secondary 2-coil spreading) of the extension spring.

3. Mating Members Prevents Rotation

Looking again at FIG. 11: endpiece 30–31 and sidepiece 47 are elongated members that have a flat side pressed against each other to prevent them from rotating in relation to each other. Upper (30) and lower (31) endpieces act together as a flat surface against the flat strip wire sidepiece 47. That is, endpiece 30–31 is a single, vertically folded-over wire, joined laterally at the fold; and it's medial ends are secured vertically in a vertical lense groove. Endpiece 30–31 can be considered two vertically-tensioned parts, especially medially (where they are spread by an unseen lense). Alternative member matings could be two strip wires, two wires with mated cuts (like >>, or c c ), etc., none shown. More than two members may be mated (not shown). Comparatively, when all members are completely round, they cannot mate, and would be prone to rotate from each other (as in Higgins' pat. FIG. 9).

It is the mated bend of both elongated members confined within the spring together that fixedly attaches the members. The assembly of such is made easy by one bent portion (like FIG. 10's tab 50) being short enough to slip between to inside the spring coils as a secondary operation. This 'cheat' slipping may be why this attachment method has not been used before. It is the mated bend that secures the members against the spring's inside diameter in both frontward-rearward and lateral-medial directions.

FIG. 12 is an embodiment of an extension spring; like spring 39. It has 22 windings,& end dead coils with bent-in ends to keep it from snagging hair.

4. An Embodiment of Completed Eyewear

FIG. 13 shows an embodiment of completed eyewear, rear view. The transverse litheness of the sidepieces lets them flex medially-frontward towards the frame allowing closure for storage. This flexing takes the place of prior-art hinges. Ear-rests are part of the eyewear shown, and their angular section just frontward of the ear-rest nubs (like nub 69) can catch underneath a nosepiece, so the sidepieces stay closed against the frame. Alternatively (none shown): ear-rests can catch in front of the lenses, in front on the frame's bridge-nosebridge, or they can be hooked together, etc. Transversely lithe sidepieces let the earpieces twist a bit to help earpieces close under nosepads; and better tailor to a wearer's ear slope, when worn.

5. Other Embodiments of Lever Eyewear

Figure 15:
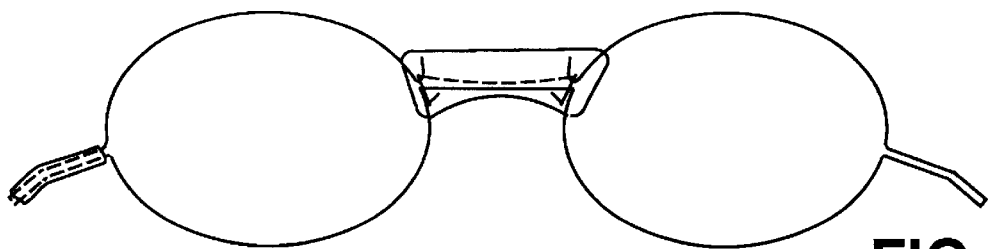
FIG. 15 is a frame with molding over nosebridge, rear view

FIG. 14 is a frame embodiment, like that of FIG. 4, but with an attached nosebridge and one-piece nosepad, made from flexible flat tubing, fed over padarm loops, rear view. FIG. 15 is a frame embodiment with plastic molding over the nosebridge. The plastic nosepiece covers the frame bridge and an armless spring metal nosebridge (not necessary with a rigid plastic nosepiece). Shrink tubing (shown on the frame's LHS lateral end) can replace the extension spring shown on previous embodiments.

Figure 16:
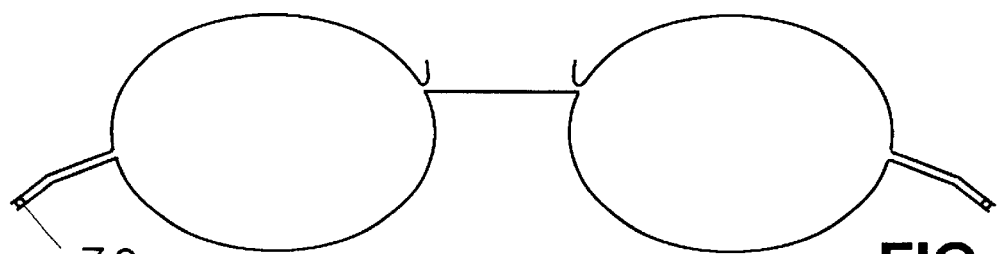
FIG. 16 is a 3-piece spot-weld frame embodiment, rear view.
Figure 17:
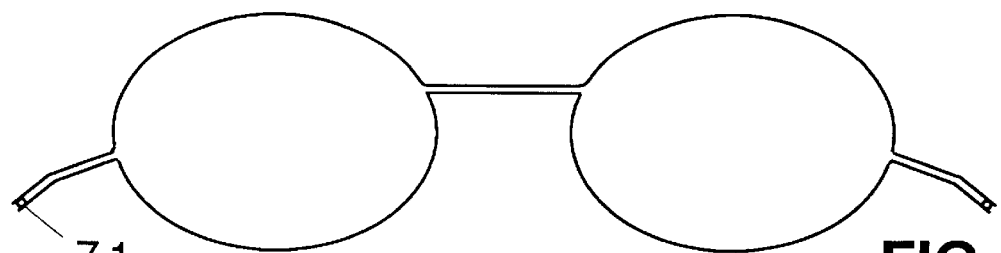
FIG. 17 is a 2-piece spot-weld frame embodiment, rear view.

Most C&C wire forming machines have wire length limitations near 9"; less than the 14.5" or so of the FIG. 4 frame embodiment. To reduce frame wire length, the frame may be made by multiple wires spot-welded together at the lateral ends. Because of the eyewear assembly of the invention, there is almost no stress at the lateral ends: lenses keep the medial portions of the frame from twisting, lithe sidepieces easily twist therein placing almost no twist stress on the endpieces, and the friction of endpiece and sidepiece within each extension spring somewhat 'clamps' the endpiece parts together. Therefore, wire annealing there has negligible effects on the frame. Frames need the most strength at the noses, or nosebridge. The welds are far from the noses. FIG. 16 is a 3-piece spot-weld frame embodiment, rear view, with spot-weld 70 noted. FIG. 17 is a 2-piece spot-weld frame embodiment, rear view,with spot-weld 71 noted.

Figure 18:
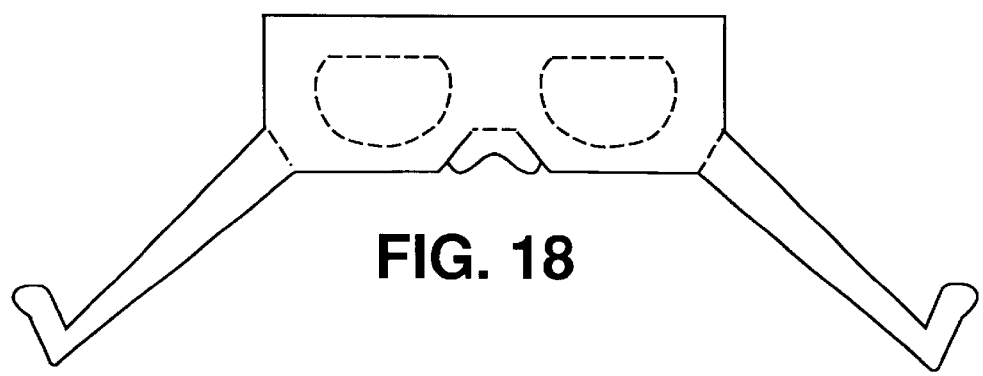
FIG. 18 is a single-piece eyewear embodiment, front view.

Disclosed, not claimed: FIG. 18, is a single piece eyewear embodiment, front view. It can be cut from one piece of 0.03" thick cardboard, where the nosepiece and sidepieces are secondarily bent rearwardly for wearing. The bends act as free hinges, so the thin sidepieces do not act lithe. Frame rearward flexibility lets the eyewear 'lengthen' to a wearer's head, so one size fits most. The lense areas (circular dotted-line areas) may be removed and plastic film may be glued in their place for 3-D or party glasses. Sidepiece length can be 4.5". The entirety of FIG. 18, including lenses, could instead be molded from a single polycarbonate plastic injection.

Other disclosed eyewear (none shown): Complete eyewear may be a single plastic piece (ear-rests may be separate to alter side length). If lenses are molded separately, a single-piece frame-sidepieces can be made, with a slit endpiece, and springs can be added on the endpieces to secure/remove each lense. Each spring can be held medially with a rearward endpiece bend or an abutment. Though a plastic spring may be used, a metal spring provides minimal bulk. Earrings can be hung from ear-rest's hook-like portion.

6. Embodiments of the Invention with Temple-Style Prior Art (none shown)

Portions of the invention may be used as parts of pressure/temple-style eyewear with bezels and/or eyewires above and/or below each lense, and/or rimless eyewear. I.e., the invention's extension spring can be used as a means to confine and/or remove a lense, or the spring can be used as a means to fixedly attach a temple or a hinge barrel. The nosebridge can snap onto prior-art eyewear bezels and/or eyewires and/or frame bridge.

The nosebridge piece is of best advantage when made flexible because it can then snap into place (encircling the frame bridge). However, the nosebridge can be formed by non-spring materials, brazed or not, then secondarily crimping it in place substantially encircling a frame bridge in the longitudinal/latitudinal plane. Other advantages are reduced brazing and added bridge strength. The lateral ends a the nosebridge can continue downwardly (optionally rearwardly and/or laterally) as nosepad arms; each for supporting a nosepad loop. The arms can be separately attached.

7. Materials, Dimensions, and Definitions

Parts may be, but are not limited to being made as follows: Nosebridge, sidepieces, and frame from plastic resins, or mixed metals. Examples: nosebridge, frame, and springs: 0.032", 0.025", and 0.009" dia. round stainless spring 17-7 wire respectively, and nosepads and ear-rests: polycarbonate; about 0.1" dia. The bend of mated parts: 60° to 90°. Sidepiece length: 3"; sidepiece tab: 0.05"; medial distance between lenses: 0.7"; extension spring length: 0.6"; and endpiece length lateral from bend 45: 0.25" FIGS. 4, 6, 7, 8A, 8B, 9A, 9B, and 9C are drawn in proportion to each other. Dimensions not expressly stated may be estimated from the drawings and dimensions given. Not shown: Frame hooks can face rearwardly or forwardly (instead of medially) to hook around the frame bridge in the longitudinal/latitudinal plane. Endpieces may be separate parts from the frame, i.e. upper and lower eyewires conjoin laterally and endpieces attach to lenses by nuts and bolts.

In this text: 'Right-hand side' and 'left-hand side' are abbreviated as RHS and LHS respectively. RHS parts are the same as LHS parts, except opposite hand. Both hand side pieces together are considered a pair. An eyewear frame is a structure connecting a pair of lenses. This can include rimless, continuous rim mounting, a continuous plastic piece formed to be used as a pair of lenses and a frame, etc. A nosebridge is a transversely elongated member for substantially transversing a wearer's nose (with or without nosepad arms).

Vertically rigid, transversely lithe sidepieces provide vertical support for lever eyewear with desired scant lateral pressure to a wearer's head, when worn. "Vertically rigid" denotes enough strength for sidepieces to leverage lenses plus frame onto a wearer's nose. "Transversely lithe" denotes enough flexibility in sidepieces, without free hinges, to prevent support of lenses plus frame by medially pressuring a wearer's head. Examples: Common temple-style eyewear, when not in use, is often worn on the head like a headband, because medial pressure makes enough friction and reargripping to hold it there. 'Transversely lithe' sidepieces do not have enough medial pressure to support eyewear on the head. [A shirt pin/spring-clip can hang eyewear by the nosepiece when not in use.] A 4" length of stainless, (17-7) with a transverse width of<0.02", or a 1.5" length with a <0.008" width may be considered lithe, compared to a 4" long temple with a width of 0.03". (1.5" being the sidepiece length outside the rigid ear-rest when adjusted for a small-head wearer. Note most pressure temples, when they thin to 0.028", do so over a short 1.5" length, then widen for medial strength.) Also, side-piece width >0.007" is not lithe enough to easily close sidepieces against a frame without hinges. Sidepieces can have a different look (like round) like if strip metal were partially over-molded with elastomer (not shown).

8. Conclusion

Construction of a small diameter wire spring metal frame nearly necessitates that all parts be mechanically assembled without brazing. It is the combination of a single wire frame, a single wire nosebridge, single wire sidepieces, grooved lenses, and attachment extension springs that makes it advantageous to use every other component therein. That is, each piece and assembly mechanism is dependent upon the others: A transversely lithe spring metal sidepiece has to be thin, and such can't be usably brazed. For it to mechanically attach with a spring, the endpiece must also be vertically strong and small enough in diameter to fit into the spring: likely, only spring metal can be strong and small enough. To prevent annealing, the endpiece must mechanically attach or be a unified part of the frame. Also, spring metal is needed for frame strength and it's small diameter so it fits in lense grooves. The nosepiece must be mechanically attached to prevent annealing wires. A spring nosebridge wire can be small enough in diameter to hook over, and flexible enough to snap onto, a frame bridge. A spring metal nosebridge wire can be small enough to upwardly loop around a pivotable nosepad balljoint. Grooved lenses keeps the bridge from rotating.

The invention is not obvious, because spring metal would change temper at any brazed joint especially with thin (<0.01") metal, and many joints are needed for metal eyewear frames. Up till now, for 200 years, eyewear has required hinges near the endpieces to close rigid temples/sidepieces to the frame. Vertically rigid, transversely lithe sidepieces uniquely produce: scant lateral pressure, twistability to tailor to a wearer's ear slope, curving around a wearer's head, and closability to a lever frame.

I claim:

1. A method of fixedly attaching a first and a second elongated member which comprises the step of: confining a mated bent portion of said first and said second member within a compression spring.

2. The method of fixedly attaching first and second elongated members, according to claim 1, wherein said first member is an eyewear endpiece, and said second member is an eyewear sidepiece.

3. The method of fixedly attaching first and second elongated members, according to claim 1, wherein said first member is a folded-over wire.

4. The method of fixedly attaching first and second elongated members, according to claim 3, which further comprises the step of: securing together an elongated length of said folded-over wire by extending said spring substantially around said length.

5. The method of fixedly attaching first and second elongated members, according to claim 1, wherein said second member is a strip spring wire part.

6. The method of fixedly attaching first and second elongated members, according to claim 1, wherein each said first member, said second member, and said spring are spring metal parts.

7. Lever eyewear comprising: a front frame and a pair of sidepieces, wherein a substantial length of each said sidepiece is vertically rigid and transversely lithe.

8. Eyewear, according to claim 7, wherein each said sidepiece is substantially strip spring wire.

9. Eyewear, according to claim 7, wherein said frame is one continuous spring wire.

10. Eyewear, according to claim 7, further including a nosebridge, and said nosebridge is one continuous spring metal wire.

11. Eyewear, according to claim 7, further comprising: said frame having a pair of endpieces, and further including a compression spring, wherein a mated bent portion of each said sidepiece and a corresponding said endpiece are fixedly attached within said spring.

* * * * *